(12) United States Patent
Bernsen (10) Patent No.: US 12,556,920 B2
(45) Date of Patent: Feb. 17, 2026

(54) RANDOM MAC CONFIGURING (71) Applicant: KONINKLIJKE PHILIPS N.V., Eindhoven (NL)

(72) Inventor: Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 566 days.

(21) Appl. No.: 17/922,435

(22) PCT Filed: Apr. 28, 2021

(86) PCT No.: PCT/EP2021/061035
§ 371 (c)(1),
(2) Date: Oct. 31, 2022

(87) PCT Pub. No.: WO2021/219672
PCT Pub. Date: Nov. 4, 2021

(65) Prior Publication Data
US 2023/0300610 A1    Sep. 21, 2023

(30) Foreign Application Priority Data

May 1, 2020  (EP) .................................. 20172609
Jun. 22, 2020 (EP) .................................. 20181399

(51) Int. Cl.
H04W 12/069  (2021.01)
H04L 9/30    (2006.01)
H04W 12/04   (2021.01)

(52) U.S. Cl.
CPC ............. *H04W 12/069* (2021.01); *H04L 9/30* (2013.01); *H04W 12/04* (2013.01)

(58) Field of Classification Search
CPC .................................................. H04W 12/069
See application file for complete search history.

(56) References Cited

U.S. PATENT DOCUMENTS

| | | | |
|---|---|---|---|
| 12,124,748 B2 | 10/2024 | Tsuji | |
| 2016/0241389 A1* | 8/2016 | Le Saint | ................... H04L 9/14 |
| 2018/0109381 A1* | 4/2018 | Cammarota | ........ H04W 12/041 |
| 2018/0109418 A1* | 4/2018 | Cammarota | .......... H04W 12/50 |
| 2019/0306710 A1* | 10/2019 | Cammarota | .......... H04W 12/06 |
| 2021/0400502 A1 | 12/2021 | Zhang | |
| 2022/0294623 A1 | 9/2022 | Yu | |
| 2022/0353757 A1 | 11/2022 | Bernsen | |
| 2023/0300610 A1 | 9/2023 | Bernsen | |

* cited by examiner

Primary Examiner — Bradley W Holder (57) ABSTRACT

There is provided a method of configuring an Enrollee device for communications in a wireless network. The method comprises, on the Enrollee side, providing a Configurator device, executing a configuration protocol, and sending by the Enrollee device, during an execution of the configuration protocol, an announcement message comprising an indication of a type of a public key previously used by the Enrollee as part of the protocol if an attempt by the Enrollee device to connect to the network has failed following an earlier execution of part of the configuration protocol. There are also provided an Enrollee and Configurator devices arranged to execute the method.

12 Claims, 3 Drawing Sheets

RANDOM MAC CONFIGURING

CROSS REFERENCE TO RELATED APPLICATIONS

This application is a U.S. national phase application of International Application No. PCT/EP2021/061035 filed on Apr. 28, 2021, which claims the benefit of EP Application Serial No. 20172609.8 filed May 1, 2020 and EP Application Serial No. 20181399.5 filed Jun. 22, 2020 and are incorporated herein by reference.

FIELD OF THE INVENTION

The present invention relates to devices and methods for use in wireless networks, in particular those conforming to the IEEE 802.11 family of standards.

BACKGROUND OF THE INVENTION

Figure 1:
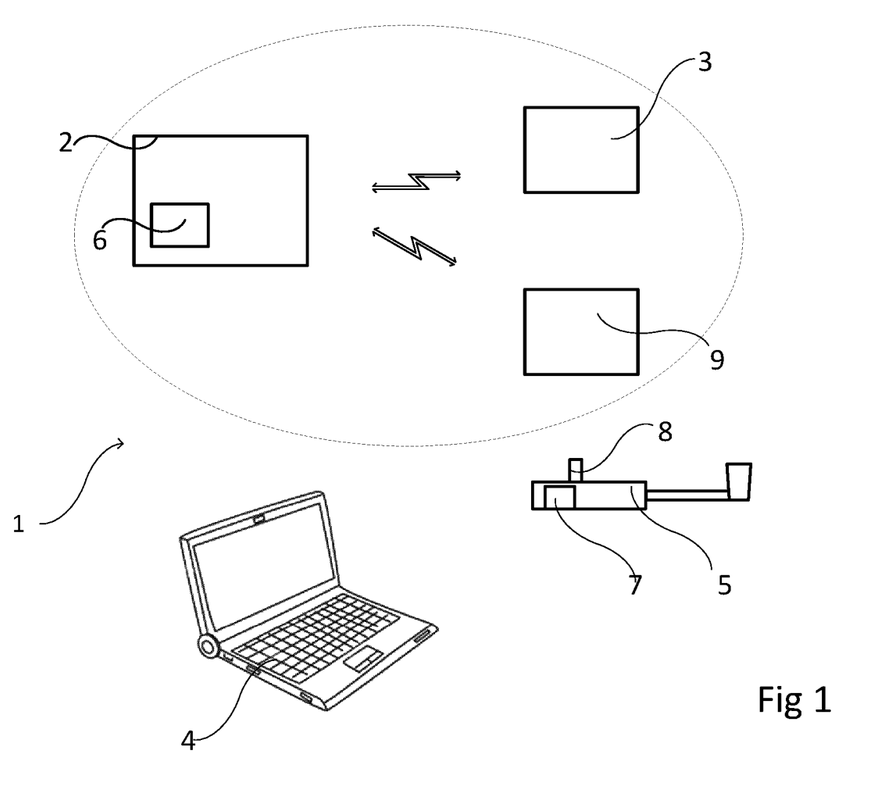
FIG. 1 represents a wireless network for which it is desired to configure devices for addition.

FIG. 1 represents a wireless network 1 which contains a first device 2 and another device 3. The first device 2 may have a central function and be like an Access Point (AP), a hub or a gateway device. The first device 2 will henceforth be referred to as an AP for simplicity though other types of device are indeed possible. The user (not shown) wishes to add two more devices to the network 1, namely a complex device 4 (here represented as a computer) and a simple device 5 (here represented as a toothbrush). Devices like the simple device 5 often do not have any real user interface (UI) other than perhaps a light and, accordingly, are often called 'headless' devices. The AP 2 has a processor 6 and the simple device 5 has a microcontroller and small non-volatile memory 7 and a button 8 which may be used to reset the simple device 5. There is also a third device 9.

Some wireless networking standards allow for one device to configure another in order to establish a connection and communicate. This makes the task of adding, or enrolling, a new device in a network less onerous in that the user no longer has to make manual entries. The device requiring configuration in order to join the network may be called an 'Enrollee' and the device performing the configuration may be called a 'Configurator'.

It may occur that, despite and apparently successful completion of a configuring process, the configured device is still unable to connect to the network 1. A number of possible causes for this situation exist, some of which are
  the Enrollee was able to contact a node that uses the network ID configured in the Enrollee and send its information and relevant keys to this node in a message to request to join, but receives a response indicating that the request is invalid or does not match expected values. In the case of IEEE 802.11 Device Provisioning Protocol (DPP) (otherwise known as 'Wi-Fi Easy Connect™'), the node may be an AP, the request message is to this AP in a DPP Peer Discovery Request message containing a DPP Connector. The response is a DPP Peer Discovery Response message and the DPP status therein is "STATUS_INVALID_CONNECTOR" or "STATUS_NO_MATCH". Reasons for these error codes are listed in clause 6.6.1 of [DPP]. One of the reasons listed there for the DPP Status "STATUS_INVALID_CONNECTOR" is that the Enrollee NAK has expired and is no longer acceptable to the AP.
  The Enrollee was able to contact s node in the network that uses the ID configured in the Enrollee, but the passphrase or PSK (Pre Shared Key) configured in the Enrollee proved to be incorrect when the Enrollee tried to associate with the node.
  The Enrollee scanned a list of channels (list included) but could not find a node with the configured ID. This may e.g. be the result of the node having moved to a channel that the Enrollee does not support, the Enrollee and/or the node being moved physically out of range, or an object that blocks the signals has been placed in between the Enrollee and the node.

In DPP, a Connector is a data structure containing information that allows the recipient device to establish a trust relationship with another device in the network in question. The Connector may contain information such as network access keys (NAK) which are used to establish shared secrets or encryption keys for use between the recipient and other devices in the network.

Devices that have a user interface, such as the complex device 5 can show the status of the connection with the AP (or equivalent node in the network in question) after configuration and if problems have occurred, for example if the device cannot find the AP (or other device to which the connection is desired). Also, the UI if a complex device may display instructions for the user on how to resolve the connection problem.

However, with simple (headless) devices, the only way the user can observe a successful connection is by either testing the functioning of the connection or inspecting the UI of the Access Point (AP), hub or gateway. If, after a configuration, these devices run into a problem when trying to connect to the network for which they were configured to connect to, the user has no idea what has gone wrong and may not realise until sometime later when they find the connection is not present or unless they think to check the AP's UI.

SUMMARY OF THE INVENTION

Thus, there is a need to provide a method of configuring an Enrollee device for communications in a wireless network comprising performing a configuration protocol. In particular, as part of the configuring the Enrollee device for communications in a wireless network, the method being arranged to be used with a Configurator device, the method comprises, executing a configuration protocol, and sending by the Enrollee device, to the Configurator device, during an execution of the configuration protocol, an announcement message comprising an indication of a type of a public key previously used by the Enrollee as part of the protocol if an attempt by the Enrollee device to connect to the network has failed following an earlier execution of part of the configuration protocol.

There is nothing forcing the Configurator signing key and the curve of the NAK in a Connector signed with this Configurator signing key to be the same.

A first approach to dealing with this problem would be that the Configurator stores the combination of MAC address and type of curve of the NAK of all Enrollees it has configured, so that the Configurator is still able to select the right curve for the key in the I-Connector it is going to use in the DPP Reconfig Authentication Request message and select the right length of the I-Nonce, which length depends on the curve type. This is, in itself, undesirable in that it forces more complexity on the Configurator and the operations that the Configurator has to perform. More importantly, current trends are for devices increasingly to use random (Wi-Fi) MAC addresses to preserve privacy. A Wi-Fi device transmits many times what is called a probe request (see [802.11]) in order to find out which APs are within its Wi-Fi range. Were it always to use the same MAC address, a device's location could be tracked, which may be considered undesirable and a violation of privacy. To preserve its privacy, a device may use random MAC addresses for each complete protocol exchange, so its location can no longer be tracked using its MAC address.

The consequence of a device using random MAC addresses for a DPP reconfiguration is that the Configurator now has no means of being able to determine the curve that the Enrollee used for its NAK when it was originally configured. The Configurator could try the curve of the signing key it used, but the NAK of the Enrollee may have been on another curve and so the process would fail. A straightforward approach, requiring no adaptation of the existing protocol would be for the Configurator to try several curves, but that would mean running the DPP Reconfig protocol several times, which would greatly increase consumption of time and Wi-Fi bandwidth. There is also an increased risk that this fails for some reason.

The reconfiguration process, especially in situations where the Enrollee device is using random MAC addresses, may be rendered more efficient and robust by having the Enrollee send a request for reconfiguration (the DPP Reconfig Announcement) with not only the cryptographic hash of the Configurator public signing key but an indication of the type of public key it holds in its Connector. According to an aspect, the Enrollee device is a simple device.

In an aspect, the method comprises the Enrollee device receiving, in response to the announcement message, from the Configurator device, a response message comprising a public key of the type indicated by the indication of a type of public key and computing a new key based on the received key and sending a further message using the new key.

Furthermore, this is particularly useful where the Enrollee is a simple device in that the process may proceed automatically i.e. avoiding that the user be forced to engage in time-consuming investigations to understand why the Enrollee device has not connected to the network.

According to an aspect, the announcement message further comprises a hash of a public key previously used by the Configurator.

According to an aspect, the indication comprises a finite cyclic group attribute.

There is also provided an Enrollee device arranged to be configured by a Configurator device for communication in a wireless network, the Enrollee device being arranged to participate in a configuration protocol, and send an announcement message to the Configurator if an attempt to connect to the network has failed following an earlier execution of a part of the configuration protocol, the announcement message comprising an indication of a type of a public key previously used by the Enrollee as part of the protocol.

According to an aspect, the Enrollee device is arranged to receive, in response to the announcement message, from the Configurator device, a response message comprising a public key of the type indicated by the indication of a type of public key and to computing a new key based on the received key and sending a further message using the new the new key.

According to an aspect the Enrollee device is a simple device.

According to an aspect, the Enrollee device is further configured to include a hash of a public key previously used by the Configurator in the announcement message.

According to an aspect, the Enrollee device is configured to include in the indication, a finite cyclic group attribute.

There is also provided, a Configurator device arranged to configure an Enrollee device for communication in a wireless network, the Configurator device being arranged to participate in a configuration protocol, receive an announcement message from the Enrollee device, the message comprising an indication of a type of a public key previously used by the Enrollee as part of the configuration protocol, to retrieve the indication, and send, to the Enrollee device, a configuration message comprising a key of the same type as the indication.

There is also provided a system comprising an Enrollee device according to an aspect and a Configurator device according to an aspect.

There is also provided computer program product when operated on a processor in an Enrollee device causes the Enrollee device to execute the method.

BRIEF DESCRIPTION OF THE DRAWINGS

The above, as well as additional objects, features and advantages of the disclosed devices, systems and methods, will be better understood through the following illustrative and non-limiting detailed description of embodiments of devices and methods, with reference to the appended drawings, in which.

DETAILED DESCRIPTION OF EMBODIMENTS

In the following description, same references designate like elements.

Figure 2:
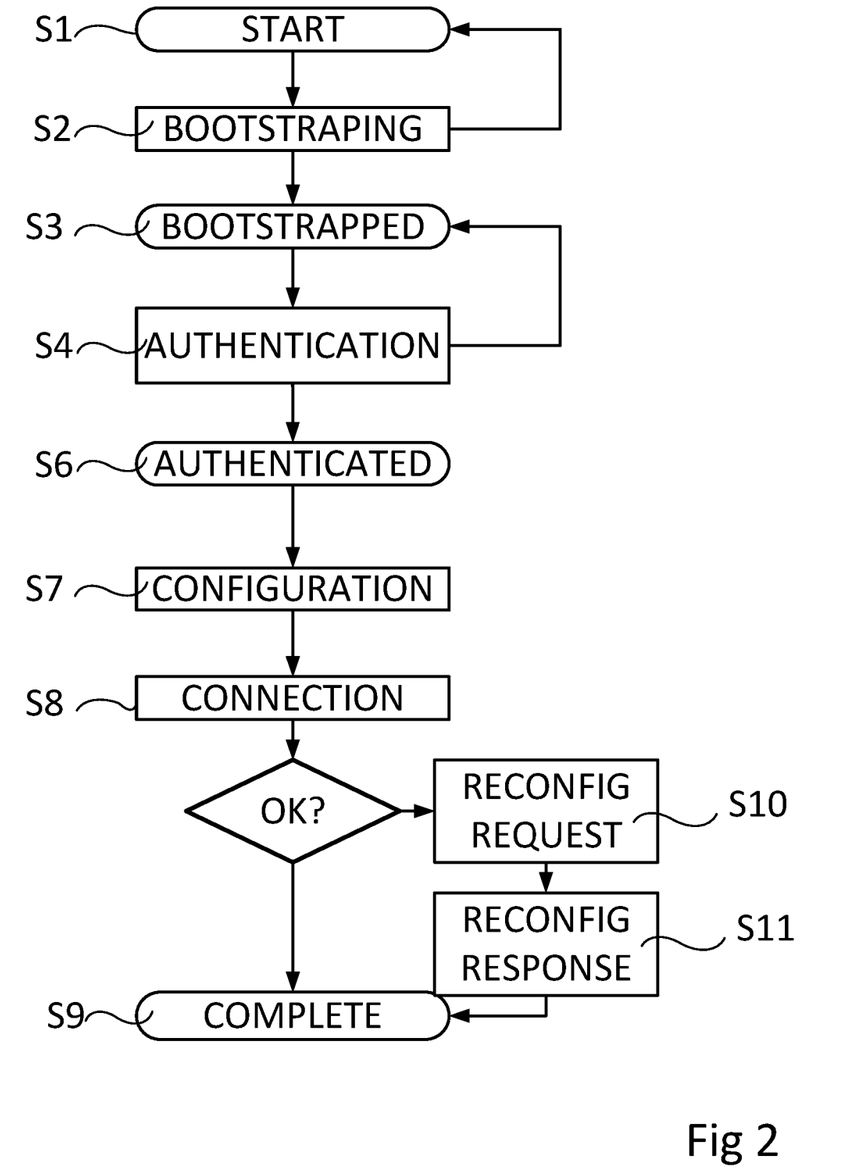
FIG. 2 represents the flow of a configuration process according to an embodiment.

FIG. 2 represents a flow of a device-controlled configuration method according to embodiments whereby one device such as the third device 9 of FIG. 1 may configure and connect to another device such as the complex or simple devices 4, 5 of FIG. 1. The third device 9 and the device 4, 5 are according to embodiments. As an example, the case of the simple device 5 will be discussed. It should be understood, that though much of this description provides examples involving a network with a device 5 like the AP 2, the process could work in a peer-to-peer situation.

One example of a device-controlled configuration method is the Device Provisioning Protocol (DPP) which is used in networks using Wi-Fi or IEEE 802.11. In the Device Provisioning Protocol (DPP), a device acting as a DPP Configurator can securely configure any Wi-Fi enabled device for connecting to a Wi-Fi AP.

At S1, the process starts with the two devices 9 and 5 in an unconnected state and device 5 is un-configured. For the purposes of discussion, device 9 will be used to configure device 5 for joining the wireless network 1 so device 9 may be referred to as the Configurator and device 5 as the Enrollee (since it is being 'enrolled' in the wireless network 1).

At S2, often referred to as 'bootstrapping', whereby one device, the Responder, obtains the bootstrapping public key (BR) of the other device, the Initiator. When mutual authentication is desired by the Responder device, it too obtains the bootstrapping public key (Br) of the Initiator. This is achieved by another means than the wireless communication technology and so is commonly called 'out-of-band' communication (OOB). Examples of this can be the user causing one device to read a QR code on the Responder, NFC communication between the two device or another wireless technology e.g. Bluetooth. The bootstrapping process is initiated by a user intervention. If the bootstrapping has been successful, the process arrives as S3 and the devices 10, 5 are 'bootstrapped', otherwise they revert to the 'start' state at S1. In either case, the Enrollee device (in this case the simple device 5) may record in an appropriate storage, for example as a flag in a register in memory, the result of the bootstrapping process. Frequently, simple devices are programmed to wake up after manufacturing or after a reset and turn on their radio on the channel indicated in their QR-code for configuration and start listening for an authentication request message At S4, the devices 9, 5 perform an authentication procedure whereby the devices establish 'trust' i.e. the user is able to be confident that the devices are what they believe them to be and not other unknown (and potentially malicious) devices 'pretending' to be one or other of the devices in question. A message is sent from one device requesting to start an authentication. This message can be sent by either the device doing the configuring (Configurator) or the device to be configured, the Enrollee. In this example, the third device 9 acts as the Configurator and the simple device 5 as the Enrollee. It should be noted that the third device 9 is shown as being connected to the network 1 though this is not necessarily required for the embodiments to work. The device starting the wireless communication is called the Initiator and the device responding is called the Responder. The DPP protocol, in particular, allows both a Configurator and an Enrollee device to act as the Initiator of the DPP protocol, whereby the other device automatically becomes the Responder. Simple devices or headless device usually will assume the Responder role.

The other device responds to this message. If the authentication request message is decoded correctly and contains the information indicating that the Initiator is the device the Responder device believes it to be and has the required capabilities, the response message indicates that the message has been 'accepted' and contains information needed by the Initiator to verify the credentials of the Responder and that it too has the required capabilities. If the two devices do not receive from the other device the required information, the process aborts and the device return to the bootstrapped state at S3. If the Initiator is the Enrollee, the authentication request message may also contain an additional part indicating the result of a previous attempt to configure the Enrollee. If the Responder is the Enrollee, then the authentication response message may contain the additional part indicating the result of the previous attempt. It should be understood that the indication also indicates whether or not there has been a previous attempt.

In the case of the DPP protocol, the first message is the Authentication Request message and the response message is the DPP Authentication Response. The Responder checks the DPP Authentication Request message contains a correctly generated cryptographic hash of the Responder public bootstrapping key and whether it has a copy of the Initiator's public bootstrapping key. The responder sends a DPP Authentication Respond message indicating whether the authentication can continue. If not, because for example the attempt to decrypt an encrypted nonce in the DPP Authentication Request message fails, the process is aborted. The DPP Authentication Response contains a cryptographic hash of the Responders public bootstrapping key and may contain the hash of the Initiator public bootstrapping key. Likewise, for the Initiator, the Enrollee may have obtained this public key by an OOB communication. The public bootstrapping key of the Initiator may then be used for mutual authentication. Without the public bootstrapping key of the Initiator, only the Initiator can authenticate the Enrollee, but not the other way around.

If the authentication response message indicates that the Responder has accepted the authentication request message and the response meets the criteria imposed by the set-up of the Initiator, the Initiator issues an authentication confirmation message. If the authentication values in the authentication response and the confirmation message are found to be correct by the relevant devices, this part of the protocol, the authentication part, is successful, the process has reached S6 and configuration can start. The confirmation message may also contain an indication of the result of a previous configuration attempt where the Enrollee is also the Initiator.

In the case of the DPP protocol, the authentication confirmation message is the DPP Authentication Confirm message.

At S7, the Enrollee device sends a configuration request message with information on what type of configuration the Enrollee wants. If the Configurator is able to grant the request, it sends a message with the information needed by the Enrollee such as a network key. The process then concludes at S8 with a successful configuration of the Enrollee. According to an embodiment, the configuration request may contain an indication of the result of a previous configuration attempt.

In the case of DPP, the request message is the DPP Configuration Request and the Configurators response is the DPP Configuration Response message. The DPP Configuration Response may contain the service set identifier (SSID) of the network the Enrollee should connect to and may contain a DPP Connector. The DPP Connector is digitally signed by the Configurator using a key (the C-sign key), and contains among other thing the public network access key of the Enrollee. The DPP Configuration Response message also contains the public signing key of the Configuration. Other devices that have been configured by the same Configurator can thereby check whether they can trust the public network access key of other devices. The DPP Configuration Response message may also contain the Wi-Fi passphrase or Pre Shared Key (PSK) of the network. The Enrollee sends a DPP Configuration Result message (depending on the version of DPP) to the Configurator to let it know whether it accepts the configuration or not. Not receiving this message by the Configurator may indicate to the Configurator that there was a Wi-Fi problem between the Configurator and the Enrollee. Then the 'supposedly configured' Enrollee can send its Connector to a DPP configured AP 2. If the Connectors signature is found correct and if the AP 2 has a matching Connector, i.e. a Connector for the same network, signed by the same Configurator, the AP2 sends its own Connector to the Enrollee. The Enrollee and the AP 2 can compute a symmetric key based on each other's network access key in the Connectors and their own private network access key in Diffie-Hellman fashion.

At S8, the Enrollee 4 or 5 attempts to connect to the network. In case of Wi-Fi, the Enrollee will have received a Wi-Fi password or Wi-Fi Pre Shared key (PSK), with which the Enrollee tries to associate with the AP 2 in the normal way through the 4-way handshake as specified in [802.11]. If the connection attempt is successful, the flow passes to S9 where it is complete.

On the other hand, if the Enrollee fails to connect, different outcomes are possible.

For a complex device 4, the Enrollee may display messages to the user to make them aware of the status and instruct them how to resolve the problems. However, a simple device 5 does not have a UI. If it does not succeed in connecting, it gives up trying after a time-out period for which it is programmed unless it has further programming as outlined herein.

The protocol may require, and indeed DPP does, that the Enrollee return to the Configurator a status message. In the case of DPP, the message is of the form Enrollee→Configurator: {DPP Status, E-nonce}ke The DPP status and E-Nonce are encrypted using an encryption key ke calculated during the initial authentication. The values of DPP status are given in the table below

| Connection Attempt Result | DPP Status |
|---|---|
| Enrollee successfully associated to the AP and has network access | STATUS_OK |
| Enrollee discovered the AP and failed to connect to the network. | STATUS_AUTH_FAILURE |
| Enrollee received an invalid connector during network introduction. | STATUS_INVALID_CONNECTOR |
| Received AP Connector is verified and valid but no matching Connector could be found by Enrollee. | STATUS_NO_MATCH |
| Enrollee failed to discover an access point. | STATUS_NO_AP |

If the status message indicates that the Enrollee was successful in connecting to the network it was just configured for, the flow passes to S9.

If the status message indicates that the Enrollee was not successful, there are alternatives.

In one alternative, the flow may pass to S10 where the Enrollee issues a request to the Configurator to be configured again (or for a new configuration).

In another alternative solution, the flow may return directly to S7 where the Enrollee device sends a configuration request message with information on what type of configuration the Enrollee wants. In such case, the DPP Reconfig Announcement message would not be needed. It may be helpful to note that both devices would then use the key that had been established during the earlier authentication phase. Also, since this would form part of a single protocol execution, there would be no changing of MAC address, with the problems that brings.

Although most of the times the configuration will succeed and the Enrollee will be able to connect to the network it was just configured for, connection problem may arise any time, years even later on. It may be that the AP or Enrollee was at a certain moment moved to another location and thus became out of Wi-Fi (RF?) reach. It may be that the NAK in the Enrollee Connector expired and did not get accepted anymore by the AP. It may be that the old AP was replaced by a new one and the Enrollee was overlooked in the reconfiguration for the new network. In all connection problem cases, the flow may pass to S10 where the Enrollee issues a request to the Configurator to be configured again.

At S11, the Configurator replies with a response message containing an updated (or new) configuration and the Enrollee retries the connection to the network. In terms of DPP, at this S11, there may be an execution of the DPP Configuration Protocol and DPP Introduction Protocol. If this connection is successful, the flow terminates at S9.

In the case of DPP, the reconfiguration request in S10 is DPP Reconfig Announcement, which is of the form:

Enrollee→Configurator: SHA256(C-sign key)

As can be seen, this is a simple message, consisting of the SHA-256 hash (see [FIPS180-4]) of the public signing key of the Configurator. A Configurator receiving this message can compute the SHA-256 hash of all of the public signing keys it has used before in order to see whether or not it has configured the Enrollee that sent the DPP Reconfig Announcement message, before. If the Configurator has configured the Enrollee before, it will take on the role of Initiator in the reconfiguration and proceed by sending the DPP Reconfig(uration) Authentication request message back to the Enrollee. The form of the DPP Reconfig Authentication Request is:

Configurator→Enrollee: TransId, Protocol versionVersion, I-Connector, I-nonce.

DPP Connectors contain a so-called public network access key (NAK) and other information. DPP Connectors are digitally signed by the Configurator signing key. The I-Connector is the Initiator's Connector i.e. that of the Configurator.

The DPP Connector of an Enrollee and an AP may match or not. When they match, both devices can compute the PMK (Pairwise Master Key) that Enrollee needs for associating with the AP, see section 6.6 of [DPP]. This computation is based on the Diffie-Hellman procedure [DH]. One of the requirements for two DPP Connectors to match is that they use the same type of public key. By 'same type of public key', it is meant the same type of encryption and certain parameters relating to the encryption are the same.

For example, the implementation of the protocol in [DH] uses the multiplicative group of integers modulo q, where q is prime (referred to in [DH] as "a finite field GF(q) with a prime number q of elements), and $\alpha$ is a primitive root modulo q (referred to in [DH] as "a fixed primitive element of GF(q)). Both parties should agree on q and $\alpha$ when using the implementation of Diffie-Hellman as described in [DH]. All public keys generated with the same value of q and $\alpha$ are considered the same type of public key for the purposes of the present document.

One may also use elliptic curves for Diffie-Hellman, see [NIST 800-56A-3]. When using elliptic curves, both parties have to agree on all the elements defining the elliptic curve, that is, the domain parameters of the scheme. Table 24 in [NIST 800-56A-3] lists many named sets of domain parameters, e.g. P-256, P-384 and P-521. The larger the number in the name, the better or stronger the security is that Diffie-Hellman provides against attacks. All public keys generated with the same set of domain parameters for an elliptic curve, e.g. P-256, are considered the same type of public key for the purposes of the present.

It is useful to note that DPP specifies the use of P-256, P-384, P-521, Brainpool P-256r1, Brainpool P-384r1 and Brainpool P-512r1 for the DPP version of Diffie-Hellman in the DPP Authentication Protocol. The Brainpool curves are specified in [RFC 5639].

It should be understood that actual public keys, e.g. a particular P-256 key, when they are transferred in a message usually contain the type of public key in the structure that contains the public key. An example of an elliptic curve public key represented as the ASN.1 structure called SubjectPublicKeyInfo as specified in section 4.1 of [RFC 5280] is the following in ASN.1 notation:

SEQUENCE {
  SEQUENCE {
    OBJECTIDENTIFIER 1.2.840.10045.2.1 (ecPublicKey)
    OBJECTIDENTIFIER 1.2.840.10045.3.1.7 (P-256)
  }
  BITSTRING
  0x0343A6A094A9BC6C9B92CBA3164849F0DB0B91350270ABE80DC554B1E6B3897F30: 0 unused bit(s)
}

Both OBJECTIDENTIFIERs together define the type of public key, while the BITSTRING contains the value of this particular public key.

In DPP, Elliptic Curve Cryptography [RFC 6090] is used for all asymmetric cryptography, especially the Network Access Key (NAK) and the Configurator signing key, but other forms of asymmetric cryptography, such as the multiplicative group of integers modulo q as described in [DH], are also possible.

The I-Connector sent in the DPP Reconfig (uration) Authentication request does not serve its normal purpose of configuring the Enrollee. Instead, it provides the Enrollee with a Configurator supplied public key, the Configurator NAK, which is signed by the Configurator, so that the Enrollee can check the signature and this way becomes able to trust that the Configurator NAK is indeed from its Configurator. The Configurator NAK in this case is used as one of the several components with which the Enrollee and Configurator create a shared key for the encrypted part of the DPP Reconfig Authentication protocol and the following DPP Configuration protocol. In this case, the Configurator NAK is also called Cr in the DPP specification [DPP].

Now, an Enrollee receiving a DPP Reconfig Authentication Request message from its Configurator uses the NAK in its own Connector, (the R-Connector it received from its Configuration during the previous DPP Configuration), and the I-Nonce and $C_I$ from the I-Connector it received in the DPP Reconfig Authentication Request to compute a key ke, as specified in section 6.5.4 "DPP Reconfig Authentication response" of [DPP]. As explained before, this computation can only be done if both NAKs use the same type of public key, so in the DPP case are both ECC points on the same curve.

When the DPP Configurator receives a DPP Reconfig Announcement, it only knows the Wi-Fi MAC address of the Enrollee sending it. The DPP Configurator is able to find the Configurator signing key that the Enrollee sent the SHA-256 hash of, by comparing the SHA-256 hash of all public signing keys that it has used before and comparing these hashes to the received hash. This gives the DPP Configurator also knowledge of the curve used for signing the DPP Connector sent to the Enrollee when this Enrollee was originally configured.

However, the inventor has realised that the curve for the Configurator signing key and the curve of the NAK in a Connector signed with this Configurator signing key need not be the same.

A first approach to this problem would be that the Configurator stores the combination of MAC address and type of curve of the NAK of all Enrollees it has configured, so that the Configurator is still able to select the right curve for the key in the I-Connector it is going to use in the DPP Reconfig Authentication Request message and the right length if the I-Nonce, which length depends on the curve type. This is, in itself, undesirable in that it forces more complexity on the Configurator and the operations that the Configurator has to perform.

However, the inventor has also realised that a more serious problem arises. The current trends are for devices increasingly to use random (Wi-Fi) MAC addresses to preserve privacy. A Wi-Fi device transmits many times what is called a probe request (see [802.11]) in order to find out which APs are within its Wi-Fi range. Were it always to use the same MAC address, a device's location could be tracked, which may be considered undesirable and a violation of privacy. To preserve its privacy, a device may use random MAC addresses for each complete protocol exchange, so its location can no longer be tracked using its MAC address.

The consequence of a device using random MAC addresses for a DPP reconfiguration is that the Configurator now has no means of being able to determine the curve that the Enrollee used for its NAK when it was originally configured. The Configurator could try the curve of the signing key it used, but the NAK of the Enrollee may have been on another curve and so the process would fail. A straightforward approach, requiring no adaptation of the existing protocol would be for the Configurator to try several curves, but that would mean running the DPP Reconfig protocol several times, which would greatly increase consumption of time and Wi-Fi bandwidth. There is also an increased risk that this fails for some reason.

The reconfiguration process, especially in situations where the Enrollee device is using random MAC addresses, may be rendered more efficient and robust by having the Enrollee send a request for reconfiguration (the DPP Reconfig Announcement) with not only the cryptographic hash of the Configurator public signing key but an indication of the type of public key it holds in its Connector. The improved message may thus be:

Enrollee→Configurator: SHA256(C-sign key), group
where group is the Finite Cyclic Group attribute as specified in clause 8.1.1.12 "Finite Cyclic Group attribute" of [DPP], using the registry maintained by IANA as "Group Description" attributes for IETF RFC 2409 [RFC 2409] and [IKE] and group indicates the type of public key of the NAK in the Connector of the Enrollee. Other ways to indicate the type of public key are of course also possible, e.g. by using an appropriate set of OBJECTIDENTIFIERs as done in the ASN.1 example of a public key mentioned before, or by the ASN.1 structure called AlgorithmIdentifier as specified in section 4.1.1.2 of [RFC 5280].

Thus, the method of configuring an Enrollee device for communications in a wireless network can comprise providing a Configurator device, executing a configuration protocol, and sending by the Enrollee device, during an execution of the configuration protocol, an announcement message comprising an indication of a type of a public key previously used by the Enrollee as part of the protocol if an attempt by the Enrollee device to connect to the network has failed following an earlier execution of part of the configuration protocol.

In effect, the Enrollee device may be arranged to be configured by a Configurator device for communication in a wireless network and send an announcement message to the Configurator if an attempt to connect to the network has failed following an earlier execution of a configuration protocol, the announcement message comprising an indication of a type of a public key previously used by the Enrollee as part of the protocol.

The Configurator, when it receives this message (the DPP Reconfig Announcement message, enhanced, according to an embodiment, with the type of public key indication, in the case of DPP) is then able to know and hence select the correct type of key to include in the Connector it will send back (the DPP Reconfig Authentication Request in the case of DPP). Thus, the Configurator device maybe arranged to configure an Enrollee device for communication in a wireless network. The Configurator device may receive an announcement message from the Enrollee device which comprises an indication of a type of a public key previously used by the Enrollee a part of the configuration protocol. The configurator device may retrieve the indication and send a configuration message comprising a key of the same type as the indication.

It is then no longer necessary for the Configurator to embark on a process of searching its records or, worse still, of trial and error to find the correct type of key to use. Identifying and selecting the correct type of key may be achieved without significant increase in the use of resources i.e. time and bandwidth.

Furthermore, this is particularly useful where the Enrollee is a simple device in that the process may proceed automatically i.e. avoiding that the user be forced to engage in time-consuming investigations to understand why the Enrollee device has not connected to the network.

Figure 3A:
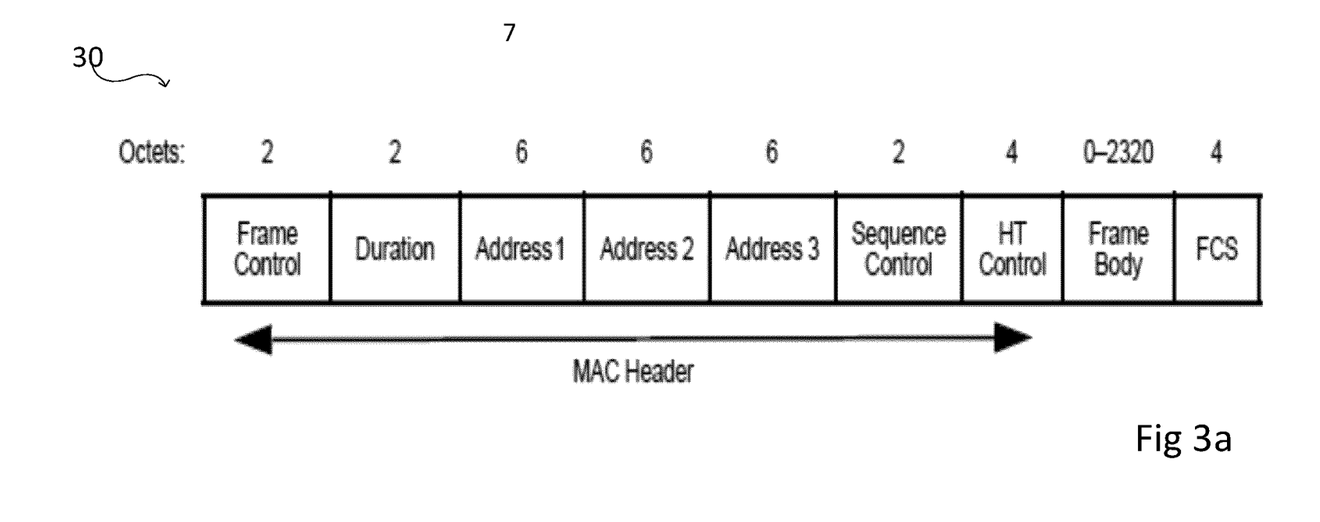
FIG. 3a represents an exemplary 802.11 MAC frame which may be according to an embodiment.

FIG. 3a represents an example of a Medium Access Control (MAC) frame. The example in question is that of the IEEE 802.11 standard. It should be understood however that other formats are possible as long as there is a frame body or payload part. For the purposes of the present, the other parts, frame header and the error checking (here FCS) are not important.

In the DPP Configuration Protocol phase of DPP, the general MAC frame format is that of the GAS Frame according to the IEEE 802.11 standard. In the DPP Authentication protocol phase of DPP, the general MAC frame format is that of the Public Action frame according to the IEEE 802.11 standard. Attributes may be added to the various messages, including the Reconfig Announcement messages.

Figure 3B:
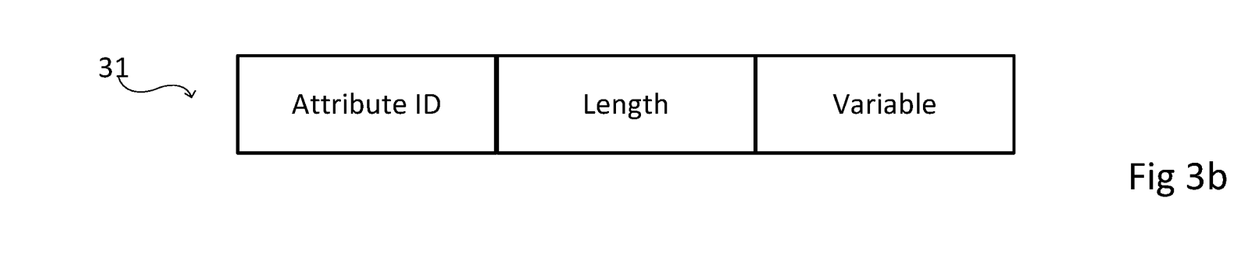
FIG. 3b represents an attribute according to an embodiment for an 802.11 MAC frame.

FIG. 3b represents the general form of an attribute which would form part of the payload of the frame of FIG. 3a and would contain the content of Reconfig Announcement and Reconfig Request message according to embodiments i.e. SHA256 (C-sign key), group and TransId, Protocol version-Version, I-Connector, I-nonce, respectively.

Since the Configurator has to detect this, it must be programmed accordingly to parse the messages correctly. It should be understood that this adds complexity and lengthens the execution time for the Configurator. There is also added complexity on the Enrollee side in that more complicated firmware and larger non-volatile memory are required. It should be borne in mind that there is great downward price pressure on such devices and even apparently small additions demand justification. Furthermore, many such devices are battery-powered and any extra energy expenditure, such as retrieving information, composing more complex messages and sending those more complex and longer messages is actively discouraged, particularly where the batteries are small and intended to last a long time. Lastly, changing the protocol often involves other modifications to allow handling of legacy devices.

Aspects of the embodiments may be implemented in a computer program product, which may be a collection of computer program instructions stored on a computer readable storage device which may be executed by a computer. The instructions may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The following may be used as reference documents:

[802.11] IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), December 2016

[DH] Diffie, W.; Hellman, M. (1976), "New directions in cryptography", IEEE Transactions on Information Theory, 22 (6): 644-654

[DPP] Device Provisioning Protocol-Technical Specification-Version 1.0, Wi-Fi Alliance, 2018, https://www.wi-fi.org/file-member/device-provisioning-protocol-specification.

[FIPS180-4] FIPS180-4, "Secure Hash Standard", United States of America, National Institute of Standards and Technology, Federal Information Processing Standard (FIPS) 180-4

[IKE] Internet Key Exchange (IKE) Attributes, Group Description (Value 4), https://www.iana.org/assignments/ipsec-registry/ipsec-registry.xhtml #/ipsec-registry-10

[NIST 800-56A-3] NIST Special Publication 800-56A, Revision 3, "Recommendation for Pair-Wise Key-Establishment Schemes Using Discrete Logarithm Cryptography", Elaine Barker, Lily Chen, Allen Roginsky, Apostol Vassilev, Richard Davis, https://doi.org/10.6028/NIST.SP.800-56Ar3

[RFC 2409] RFC 2409, The Internet Key Exchange, November 1998, https://datatrackerietf.org/doc/rfc2409/.

[RFC 5280] RFC 5280, Internet X.509 Public Key Infrastructure Certificate and Certificate Revocation List (CRL) Profile, https://datatracker.ietf.org/doc/rfc5280/

[RFC 5639] RFC 5639, Elliptic Curve Cryptography (ECC) Brainpool Standard Curves and Curve Generation, March 2010, https://datatracker.ietf.org/doc/rfc5639/.

[RFC 6090] RFC 6090, Fundamental Elliptic Curve Cryptography Algorithms, February 2011 https://datatracker.ietf.org/doc/rfc6090/

The invention claimed is:

1. A method of configuring an enrollee device for communications in a wireless network, the method being arranged to be used with a configurator device, the method comprising:
   executing a configuration protocol;
   sending by the enrollee device, to the configurator device, during an execution of the configuration protocol, an announcement message comprising an indication of a type of a public key previously used by the enrollee device as part of the protocol if an attempt by the enrollee device to connect to the network has failed following an earlier execution of part of the configuration protocol; and
   receiving, by the enrollee device from the configurator device in response to the announcement message, a response message comprising a public key of the type indicated by the indication of a type of public key and computing a new key based on the received key and sending a further message using the new key.

2. The method of claim 1, wherein the enrollee device is a simple device.

3. The method of claim 1, wherein the announcement message further comprises a hash of a public key previously used by the configurator device.

4. The method of claim 1, wherein the indication comprises a finite cyclic group attribute.

5. An enrollee device arranged to be configured by a configurator device for communication in a wireless network, the enrollee device comprising a processor and being arranged to:
   participate in a configuration protocol; and
   send an announcement message to the configurator device if an attempt to connect to the network has failed following an earlier execution of a part of the configuration protocol, the announcement message comprising an indication of a type of a public key previously used by the enrollee device as part of the protocol, and wherein a finite cyclic group attribute is included in the indication.

6. The enrollee device of claim 5, wherein the enrollee device is arranged to receive, in response to the announcement message, from the configurator device, a response message comprising a public key of the type indicated by the indication of a type of public key and to computing a new key based on the received key and sending a further message using the new the new key.

7. The enrollee device of claim 5, wherein the enrollee device is a simple device.

8. The enrollee device of claim 5, further configured to include a hash of a public key previously used by the configurator device in the announcement message.

9. A non-transitory computer storage medium comprising a computer program product that, when operated on a processor in an enrollee device for communications in a wireless network, causes the enrollee device to execute a method comprising:
   execute a configuration protocol;
   send, by the enrollee device to a configurator device, during an execution of the configuration protocol, an announcement message comprising an indication of a type of a public key previously used by the enrollee device as part of the protocol if an attempt by the enrollee device to connect to the network has failed following an earlier execution of part of the configuration protocol; and
   receive, by the enrollee device from the configurator device in response to the announcement message, a response message comprising a public key of the type indicated by the indication of a type of public key and computing a new key based on the received key and sending a further message using the new key.

10. The non-transitory computer storage medium of claim 9, wherein the enrollee device is a simple device.

11. The non-transitory computer storage medium of claim 9, wherein the computer program product is further configured to cause the enrollee device to include a hash of a public key previously used by the configurator device in the announcement message.

12. The non-transitory computer storage medium of claim 9, wherein the computer program product is further configured to cause the enrollee device to include in the indication, a finite cyclic group attribute.

* * * * *